US012646397B2

(12) United States Patent
Kim et al.

(10) Patent No.: US 12,646,397 B2
(45) Date of Patent: Jun. 2, 2026

(54) IMAGE-BASED REMOTE HOME CARE SYSTEM

(71) Applicant: QUANTUM TECHNSECU.CO., LTD., Seoul (KR)

(72) Inventors: Hyun Chul Kim, Seoul (KR); Seung Chul Kim, Suwon-si (KR)

(73) Assignee: QUANTUM TECHNSECU.CO., LTD.

( * ) Notice: Subject to any disclaimer, the term of this patent is extended or adjusted under 35 U.S.C. 154(b) by 0 days.

(21) Appl. No.: 18/709,508

(22) PCT Filed: Apr. 12, 2022

(86) PCT No.: PCT/KR2022/005261
§ 371 (c)(1),
(2) Date: May 12, 2024

(87) PCT Pub. No.: WO2023/090547
PCT Pub. Date: May 25, 2023

(65) Prior Publication Data
US 2025/0029466 A1 Jan. 23, 2025

(30) Foreign Application Priority Data

Nov. 16, 2021 (KR) ........................ 10-2021-0157231

(51) Int. Cl.
*G08B 21/04* (2006.01)
*G06V 10/764* (2022.01)
(Continued)

(52) U.S. Cl.
CPC ....... *G08B 21/0476* (2013.01); *G06V 10/764* (2022.01); *G06V 20/52* (2022.01);
(Continued)

(58) Field of Classification Search
CPC ........... G08B 21/0476; G08B 21/0423; G08B 21/04; G06V 10/764; G06V 20/52; G06V 40/20
See application file for complete search history.

(56) References Cited

U.S. PATENT DOCUMENTS

| | | | | |
|---|---|---|---|---|
| 11,068,742 | B2 * | 7/2021 | Lee | ........................ G06F 18/251 |
| 11,328,163 | B2 * | 5/2022 | Abeykoon | ........... G08B 25/006 |
| 2011/0096149 | A1 * | 4/2011 | Au | ................... G08B 13/19628 348/47 |

FOREIGN PATENT DOCUMENTS

| | | |
|---|---|---|
| JP | 2017098180 A | 6/2017 |
| JP | 2021-033646 A | 3/2021 |

(Continued)

OTHER PUBLICATIONS

English Specification of JP2021-033646A.
(Continued)

*Primary Examiner* — John A Tweel, Jr.
(74) *Attorney, Agent, or Firm* — ANTONIO HA & U.S. PATENT, LLC

(57) ABSTRACT

The present invention provides a home care system. More specifically, the present invention relates to an image-based remote home care system which monitors, in real time, occurrence of various unexpected events, such as an emergency, on the basis of an image of a person to be observed captured using an IP-CAM at a remote location. According to an embodiment of the present invention, one or more IP-CAMs are installed or a smart terminal is prepared in a habitation of a vulnerable person, such as a senior citizen living alone, current images of the person to be protected are captured and collected in real time, and occurrence of an emergency is determined through analysis of the collected images and is reported to an associated emergency center, so that a person to be protected can be protected.

6 Claims, 6 Drawing Sheets

(51) Int. Cl.
    *G06V 20/52*       (2022.01)
    *G06V 40/20*       (2022.01)
    *G08B 25/10*       (2006.01)

(52) U.S. Cl.
    CPC ......... *G06V 40/20* (2022.01); *G08B 21/0423*
               (2013.01); *G08B 25/10* (2013.01)

(56)             References Cited

FOREIGN PATENT DOCUMENTS

| KR | 10-1097235 | 12/2011 |
| KR | 10-1927373 | 12/2018 |
| KR | 10-2171742 | 10/2020 |
| KR | 10-2021-0098640 | 8/2021 |
| KR | 10-2021-0116318 | 9/2021 |
| KR | 10-2379275 | 3/2022 |

OTHER PUBLICATIONS

English Specification of 10-1097235.
English Specification of 10-2171742.
English Specification of 10-2379275.
English Specification of 10-2021-0098640.
English Specification of 10-2021-0116318.
English Specification of 10-1927373.
English translation of 'JP2017098180A'.

* cited by examiner

IMAGE-BASED REMOTE HOME CARE SYSTEM

TECHNICAL FIELD

The present invention relates to a home care system, and in particular, to an image-based remote home care system that monitors in real time the occurrence of various unexpected events such as emergency situations based on images of the observed person captured using IP-CAM at a remote location.

BACKGROUND ART

Recently, the phenomenon of nuclear families and aging has become prominent, and as a result of this phenomenon, the number of various types of socially vulnerable groups exposed to risk in everyday life is increasing. In particular, the number of elderly people living alone without a caregiver who may help in emergency situations is increasing every year due to aging.

These elderly people living alone are in a situation where they cannot immediately receive help from other people, such as family, even though emergency first aid must be provided with the help of others due to limitations in behavior when a sudden change in their body occurs one day.

Social and economic problems related to age-related diseases, loneliness, poverty, and joblessness are challenges facing an aging society, and there is a need for a variety of monitoring systems to respond to emergency situations where health problems suddenly occur in elderly people living alone who have difficulty receiving help from anyone.

As a system proposed for such elderly people living alone, Korean Patent Publication No. 10-1927373 discloses a monitoring method in which resident monitoring devices attempt to capture the resident's movements using data received from cameras or motion detectors; if no movement is detected for a specified period of time, the resident monitoring device outputs an alarm signal, and following the alarm signal, the resident monitoring device attempts to capture the resident's movement; and if no movement is detected within the specified time, the resident monitoring device transmits an alarm message to the management server through a broadband communication network, and the microphone connected to the resident monitoring device through a local personal communication network senses biometric data through a bio-signal sensor built into the microphone grill.

According to these prior art documents, it is possible to expect the effect of remotely monitoring various conditions of residents and managing residents according to the monitoring results.

PRIOR ART (Patent Document 1) Korean Patent Publication No. 10-1927373 (Publication date: Dec. 12, 2018)

DETAILED DESCRIPTION OF INVENTION

Technical Problem

The present invention has the task of providing a remote home care service that not only manages and supervises socially vulnerable groups such as the aforementioned elderly living alone from a remote location, but also allows immediate action to be taken without missing the golden time when an emergency situation occurs.

Further, the present invention has the task of providing a system that obtains images in different formats from a plurality of IP-CAMs and one or more smart terminals capable of video recording installed in the house and equalizes the images taken of protected persons collected through image correction, thereby producing accurate analysis results.

Technical Solution

In order to address the above-mentioned issues, the image-based remote home care system according to a preferred embodiment of the present invention may comprise one or more Internet Protocol Cameras (IP-CAMs) installed in the residence where a protected person lives and recording the protected person's motion in real time, a gateway connected to the Internet Protocol Camera (IP-CAM) by wire or wirelessly and transmitting images of the protected person captured by the IP-CAM to an external information and communication network, and a main server connected to the gateway of each residence through the information and communication network to collect images of the protected person in real time, determining the current state of the protected person through motion analysis for each protected person, and requesting emergency dispatch to an emergency situation center in the event of an emergency, and the main server may analyze the collected images of the protected person using a learning model that has been machine-learned over several months from a number of learning images captured in various environments.

The gateway may be located in the residence and be further connected to one or more smart terminals installed with an application that operates in conjunction with the main server, and the application may capture the protected person in real time at different positions and angles from the IP-CAM through a camera mounted on the smart terminal and transmit the image of the protected person to the main server through the gateway.

The main server may comprise an image collection unit receiving one or more images of the protected person in real time from the gateway of each residence, a member management unit providing a membership registration procedure for the protected person and a guardian, storing the information of registered protected person and guardian in the member database, and identifying the protected person who is the party to the collected image, an image classification unit classifying the corresponding images of the protected person for each identified protected person and storing images in an image storage, an image analysis unit extracting the protected person appearing in the classified images of the protected person and analyzing the motion of the extracted protected person to determine whether an emergency situation has occurred, and a learning unit performing machine learning using a number of learning images stored in the learning database and providing a learning model learned when analyzing the motion of the protected person in the image analysis unit.

The main server may comprise a notification generation unit, when the image analysis unit determines that an emergency situation has occurred for the protected person, referring to the guardian and protected person's information to identify the protected person's guardian and providing a warning notification about the emergency situation to the guardian's terminal.

The protected person's image may be divided into a plurality of images with different characteristics taken at the same time by a plurality of IP-CAMs or smart terminals, and the Image analysis unit may comprise an attribute extraction unit referring to meta information included in the plurality of images to extract attributes including scale, resolution, and frame of each image, an image process unit converting the plurality of images into image data in a consistent format according to the extracted attributes and tracking the protected person appearing in the images, and a motion determination unit recognizing the motion of the protected person in the images using the learning model and determining whether the motion corresponds to an emergency situation.

The image process unit may comprise a conversion unit converting the scale and resolution of each image to correspond to the attributes of the reference image, an interpolation unit generating and adding interpolation frames to images that are smaller than or equal to a reference frame among a plurality of images, and a matching unit defining an area captured by each image according to the captured direction and angle and matching the areas of the corresponding images when the protected person appears in two or more images at the same time.

The main server may be further connected to one or more guardian terminals owned by the guardian or social worker of the protected person through the information and communication network, and the guardian terminal may receive a warning notification from the main server when an emergency situation occurs in the related protected person and request emergency dispatch to the emergency situation center according to the guardian's operation.

Advantageous Effects

According to an embodiment of the present invention, it has the effect of protecting protected persons by installing one or more IP-CAMs or preparing smart terminals in residences where vulnerable groups such as elderly people living alone live, collecting and filming the current appearance of the protected person in real time, determining whether an emergency situation has occurred through analysis of the collected images and reporting it to the connected emergency situation center.

Further, according to an embodiment of the present invention, it has the effect of providing more accurate analysis results by uniformizing the images collected from multiple IP-CAMs and smart terminals installed in the residence subject to management according to certain standards and linking and analyzing them.

MODE FOR INVENTION

Figure 1:
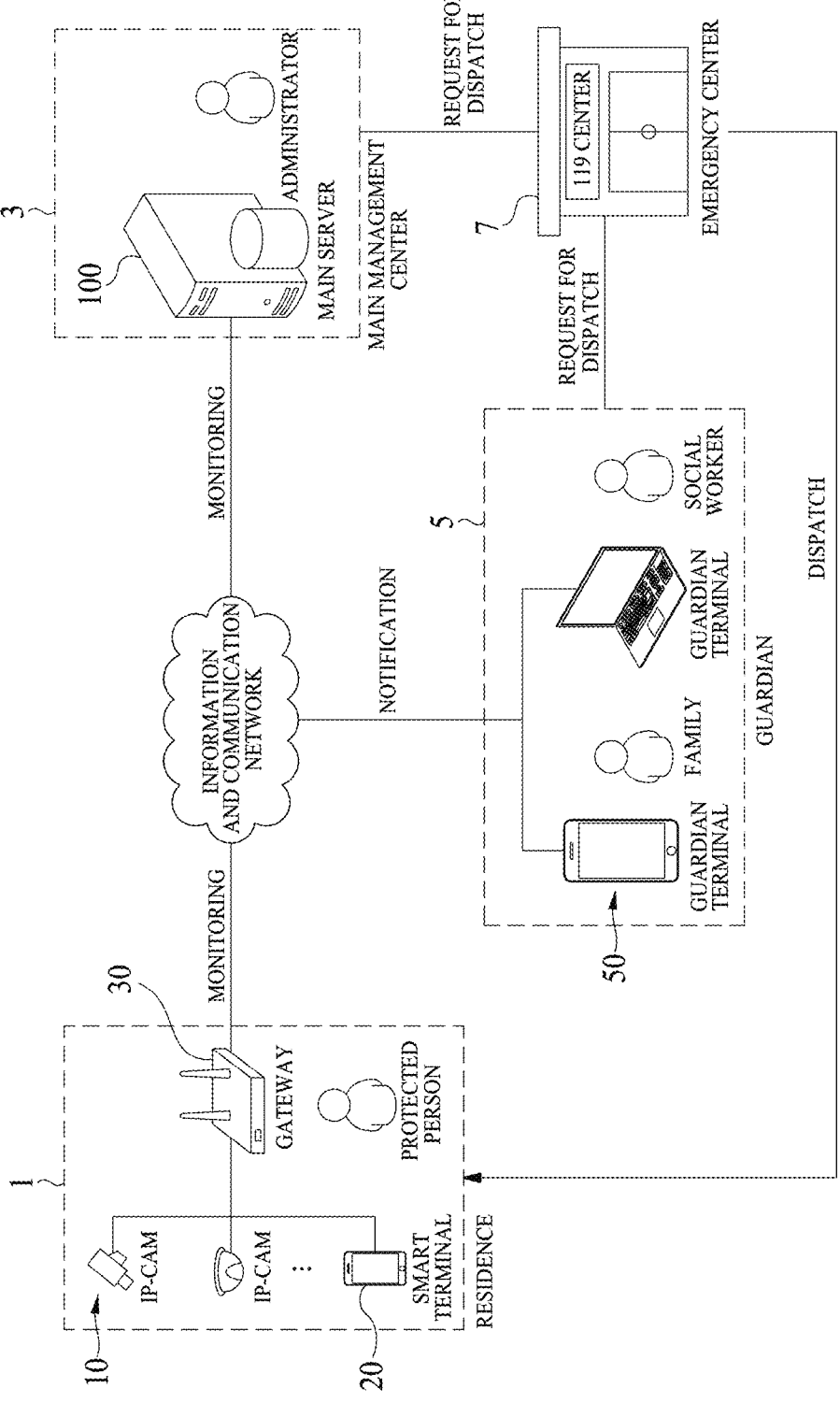
FIG. 1 is a view schematically showing the overall structure of an image-based remote home care system according to an embodiment of the present invention.

The present invention as described above will be described in detail through the attached drawings and embodiments.

It should be noted that technical terms used in the present invention are only used to describe specific embodiments and are not intended to limit the present invention. Further, technical terms used in the present invention should be interpreted in terms commonly understood by those of ordinary skill in the art to which the present invention belongs, unless otherwise defined in the present invention, and it should not be interpreted in an overly comprehensive sense or an overly narrow sense. Further, if the technical term used in the present invention is an incorrect technical term that does not accurately express the idea of the present invention, it should be replaced with a technical term that may be correctly understood by a person skilled in the art. Further, general terms used in the present invention should be interpreted according to the definition in the dictionary or according to the context and should not be interpreted in an excessively reduced sense.

Further, singular expressions used in the present invention include plural expressions unless the context clearly dictates otherwise. In the present invention, terms such as "consists of" or "comprises" should not be construed as necessarily including all of the various components or steps described in the invention, and it should be interpreted that some of the components or steps may be included, or additional components or steps may be included.

Further, terms including ordinal numbers, such as first, second, etc., used in the present invention may be used to describe components, but the components should not be limited by the terms. Terms are used only to distinguish one component from another. For example, the first component may be referred to as the second component, and similarly, the second component may also be referred to as the first component without departing from the scope of the present invention.

Hereinafter, preferred embodiments according to the present invention are described in detail with reference to the attached drawings, but identical or similar components are assigned the same reference numbers regardless of the reference numerals, and duplicate descriptions thereof are omitted.

Further, in describing the present invention, if it is determined that a detailed description of related known technologies may obscure the subject matter of the present invention, the detailed description is excluded. Further, it should be noted that the attached drawings are only intended to facilitate easy understanding of the spirit of the present invention, and it should not be construed as limiting the spirit of the present invention by the attached drawings.

Further, in the following description, the term "image-based remote home care system" of the present invention may be used interchangeably with "system" for convenience of explanation.

FIG. 1 is a view schematically showing the overall structure of an image-based remote home care system according to an embodiment of the present invention.

Referring to FIG. 1, the image-based remote home care system according to an embodiment of the present invention installs one or more IP-CAMs (10) in the residence (1) where the guardian, who is the subject of monitoring that requires management and supervision, lives, to record the appearance of the protected person 24 hours a day and provides the image of the protected person to the main server (100) of the remote main management center (3) through the gateway (30), and the main server (100) is connected to the gateway (30) of the residence (1) in each region to collect images of protected persons in real time, classifies the collected images by protected person, and performs motion analysis through a machine learning model, thereby determining whether the protected person is in the same condition as usual or whether it is an emergency situation. If it is determined that an emergency situation has occurred, the main server (100) reports to an emergency situation center, such as a connected fire station or police station, so that emergency first aid is quickly provided to the protected person.

Here, the IP-CAM (10) may be a camera device that performs known IP-based data communication and may be operated 24 hours a day to capture images of the protected person in the residence.

Further, in the residence (1), in addition to the fixed IP-CAM (10), smart terminals (20) such as smartphones and tablet PCs equipped with camera modules that allow the protected person to photograph themselves at the intended location are further deployed to be connected wirelessly to the gateway (30), and they capture the protected person with the IP-CAM (10) and provide additional images of the protected person.

Further, a guardian (5) such as a family member or social worker related to the protected person may be registered in the main server (100), and when an emergency situation occurs, the guardian is identified, and a warning notification may be provided to the guardian's terminal 50 in the form of a push message, etc.

The information and communication network connecting the above-described gateway 30 and the main server (100) includes not only a wired telephone network such as public switched telephone network (PSTN), but also a closed network such as a local area network (LAN) or wide area network (WAN), and an open network such as the Internet may be used. The Internet may refer to a worldwide open computer network structure that provides various services existing in the TCP/IP protocol and its upper layers, that is, hypertext transfer protocol (HTTP), telnet, file transfer protocol (FTP), domain name system (DNS), simple mail transfer protocol (SMTP), simple network management protocol (SNMP), network file service (NFS), and network information service (NIS). Further, examples of wireless communication networks include technical standards or communication methods for mobile communication, such as global system for mobile communication (GSM), long-term evolution (LTE), LTE advance (LTE-A), code division multiple access (CDMA), wideband CDMA (WCDMA), universal mobile telecommunications system (UMTS), wireless broadband (WiBro), or global system for mobile communications (GSM), 5G, etc. may be used, but are limited thereto.

In particular, the main server (100) according to an embodiment of the present invention determines whether an emergency situation has occurred through analysis of the motion of the protected person appearing in the collected images of the protected person and may be equipped with a machine learning module for this purpose. A detailed explanation related to such machine learning is provided later.

According to the above-described structure, the image-based remote home care system according to the embodiment of the present invention uses IP-CAM for socially vulnerable groups such as elderly people living alone in each region's residence to capture the protected person of monitoring in real time, analyzes the images of the protected person from a remote location to determine whether an emergency situation has occurred and take action.

Hereinafter, the main server of the image-based remote home care system according to an embodiment of the present invention is described in detail with reference to the drawings.

Figure 2:
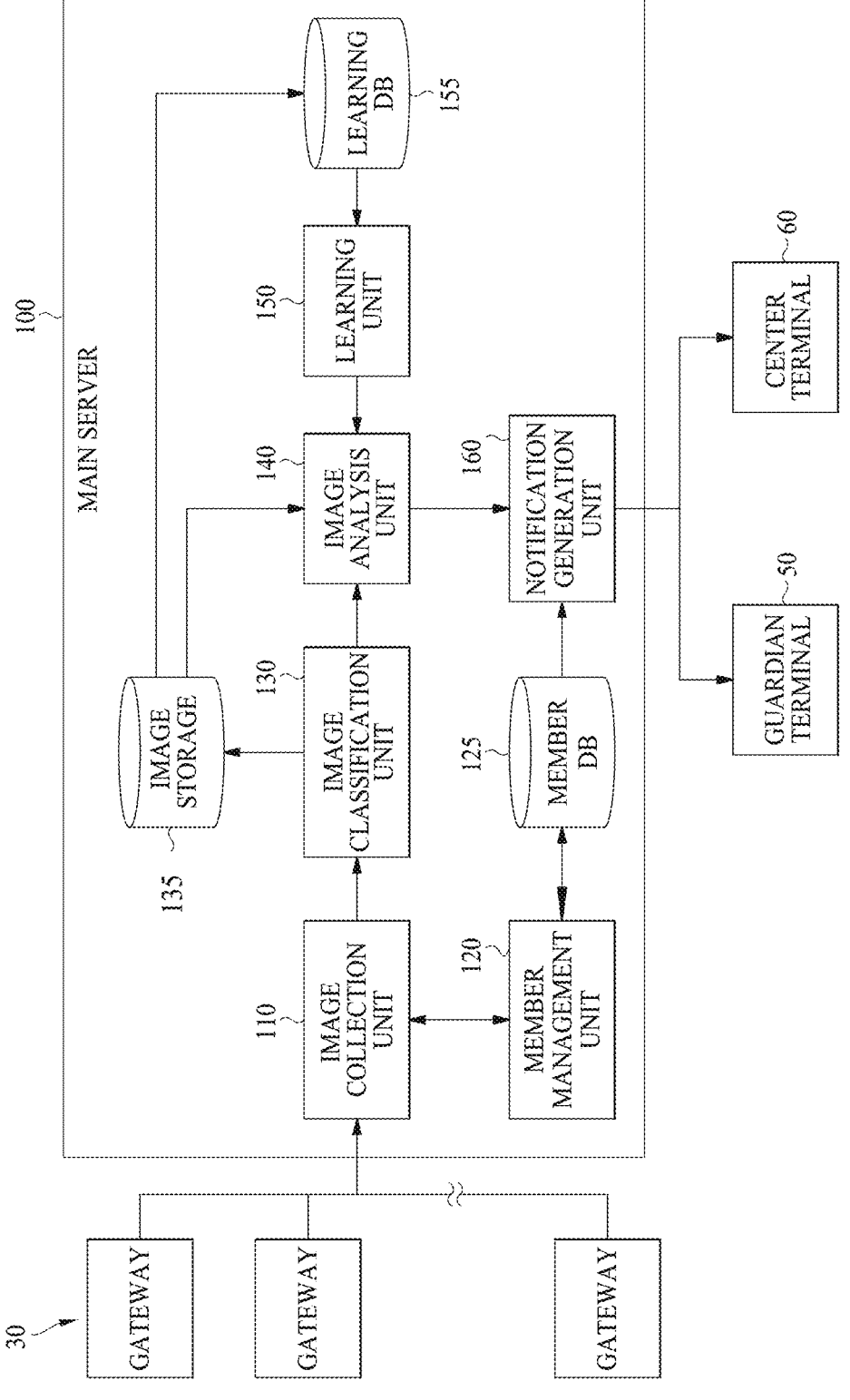
FIG. 2 is a view showing the structure of the main server of an image-based remote home care system according to an embodiment of the present invention.

FIG. 2 is a view showing the structure of the main server of an image-based remote home care system according to an embodiment of the present invention. In the following description, the main server (100) and its components of the present invention may be installed and operated on a known cloud platform. Operating a server based on a cloud platform has the advantage of freely expanding the computer resources required to store and analyze large amounts of images.

Referring to FIG. 2, the main server (100) of the image-based remote home care system according to an embodiment of the present invention may include the image collection unit (110) receiving one or more images of the protected person in real time from the gateway (30) of each residence, the member management unit (120) providing a membership registration procedure for the protected person and the guardian, storing the information of registered protected person and guardian in the member database (125), and identifying the protected person who is the party to the collected image, the image classification unit (130) classifying the corresponding images of the protected person for each identified protected person and storing images in the image storage (135), the image analysis unit (140) extracting the protected person appearing in the classified images of the protected person and analyzing the motion of the extracted protected person to determine whether an emergency situation has occurred, the learning unit (150) performing machine learning using a number of learning images stored in the learning database (155) and providing a learning model learned when analyzing the motion of the protected person in the image analysis unit, and the notification generation unit (160), when the image analysis unit (140) determines that an emergency situation has occurred for the protected person, referring to the guardian and protected person's information to identify the protected person's guardian and providing a warning notification about the emergency situation to the guardian's terminal (50).

The image collection unit (110) may receive images of the protected person captured from one or more IP-CAMs installed in residences located in each region from the gateway (30). The image collection unit (110) may check the source of each protected person's image through the IP information of the gateway, and the IP information may be used when classifying the image later.

The member management unit (120) may process membership registration and login procedures for guardians and protected persons who want to use the remote home care service according to an embodiment of the present invention and store information on guardian and protected persons in the member database (125).

In order to use the service of the present invention, membership registration is essential, and information on guardian and protected person obtained during the membership registration process may be used to implement the emergency notification function.

The member database (125) may store information on registered guardians and protected persons. This member database (125) may include guardians and protected persons' descriptions, contact information, addresses, IP information, and IP-CAM specifications installed at each residence, and this information is classified according to the protected person's images collected in real time and may be used to confirm the residential address of the protected person and the contact information of the guardian for the protected person in the event of an emergency.

The image classification unit 130 may classify images of protected persons collected in real time from the gateways (30) for each protected person. As the main server (100) collects images of protected persons in real time from multiple gateways (30) installed in multiple residences in each region, classification is required for analysis, the image classification unit (130) may identify the protected person using the IP information of the gateway (30) through which each image was transmitted, classify the collected images, and store them in the image storage (135).

The image storage (135) may store images of protected persons classified by protected person in the form of files. The image storage (135) may be allocated storage space for each account and may store images of protected persons collected in real time by the image collection unit (110), and they may be automatically deleted after a certain period of time, thereby continuously maintaining a certain amount of free space for storing additional images of protected persons.

Further, according to one embodiment of the present invention, the image storage (135) provides the stored specific images, especially images at the time determined to be an emergency according to motion analysis of the protected person, to the learning database 155 so that it may be used to update learning images.

The image analysis unit (140) may extract and track the protected person within the images through image processing of the classified image of the protected person and analyze the extracted motion of the protected person to determine whether there is abnormal motion. The gist of the present invention is to analyze images collected from IP-CAMs installed at residences in each region to determine the current state of the protected person and to take immediate action from a remote location in case of an emergency, and accordingly, the image analysis unit (140) analyzes the image of the protected person for each protected person using the prepared machine learning model, and extracts and tracks the object corresponding to the protected person in the image and analyzes the motion of the protected person to determine whether there is abnormal motion.

The learning unit (150) provides the image analysis unit (140) with a machine learning model for extraction and motion analysis of the protected person and may perform machine learning on the learning model through a plurality of learning images. Here, the learning model may determine abnormal motion based on the learning results of more than six months of multiple learning images containing human motion appearing in various backgrounds.

The learning database (155) may provide the learning unit (150) with many different types of learning images. As described above, the learning image is an image for determining whether the motion of a person appearing is an abnormal motion corresponding to an emergency situation, and such learning image may be prepared in advance as big data. Further, the learning database (155) may add images of protected persons stored in the image storage (135) that correspond to emergency situations collected by the main server (100) as learning images and provide them to the learning model.

If, as a result of the analysis of the image analysis unit (140), it is determined that an emergency situation has occurred due to a specific protected person making an abnormal motion, the notification generation unit (160) may identify the guardian associated with the protected person and send a warning notification message to the guardian terminal (50). Further, the notification generation unit (160) may request emergency first aid for the corresponding protected person to the center terminal (60) of the linked emergency situation center.

Further, the notification generation unit (160) may transmit images of the protected person in an emergency situation to the guardian terminal (50) and the center terminal (60) along with a warning notification message, thereby providing a function that allows the guardian to immediately determine the current situation.

Hereinafter, the image analysis unit mounted on the main server for image analysis according to an embodiment of the present invention is described in detail with reference to the drawings.

Figure 3:
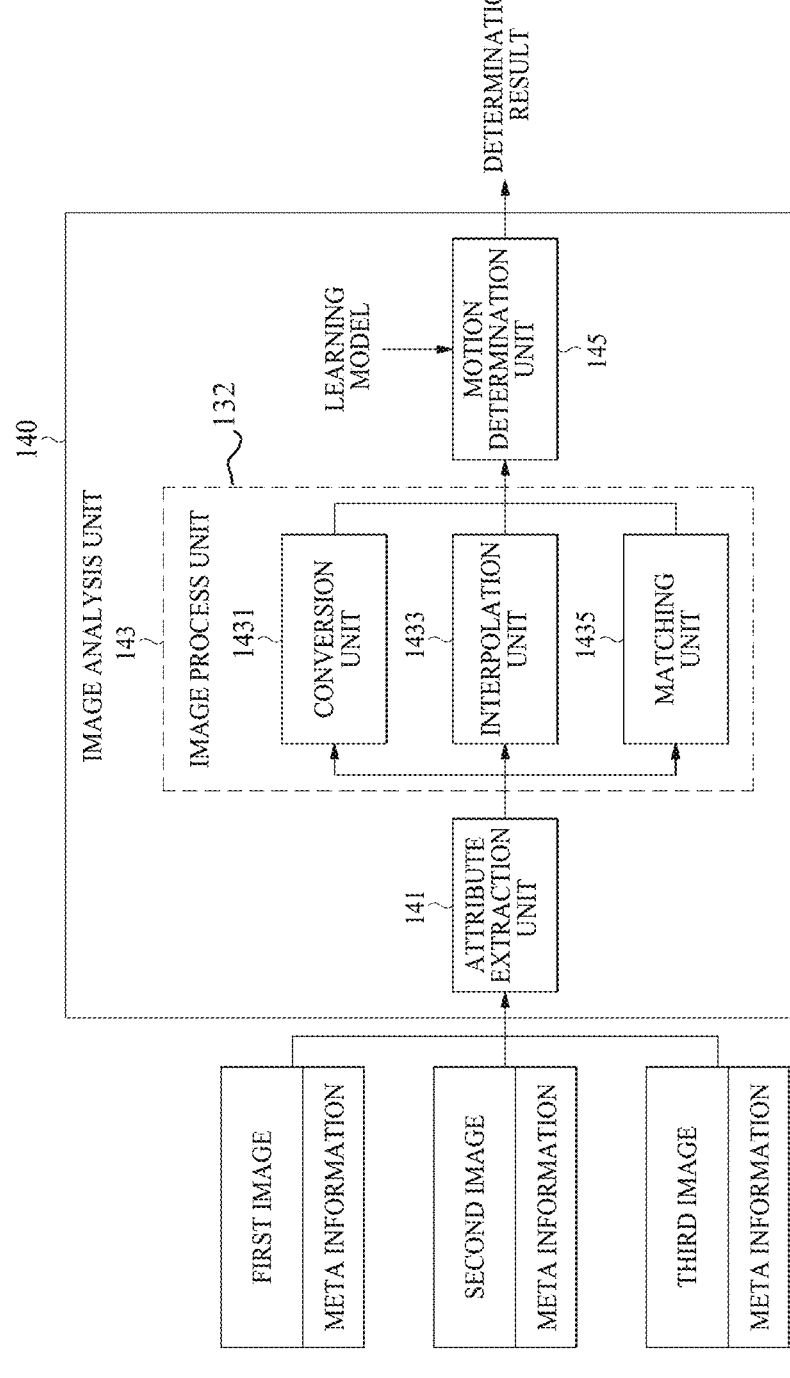
FIG. 3 is a view showing the structure of an image analysis unit mounted on the main server according to an embodiment of the present invention.

FIG. 3 is a view showing the structure of an image analysis unit mounted on the main server according to an embodiment of the present invention.

Referring to FIG. 3, the image analysis unit (140) installed in the main server of the image-based remote home care system according to an embodiment of the present invention may include the attribute extraction unit (141) referring to meta information included in the plurality of images to extract attributes including scale, resolution, and frame of each image, the image process unit (132) converting the plurality of images into image data in a consistent format according to the extracted attributes and tracking the protected person appearing in the images, and the motion determination unit (145) recognizing the motion of the protected person in the images using the learning model and determining whether the motion corresponds to an emergency situation.

The attribute extraction unit (141) may extract attributes of images of the protected person according to various formats being transmitted. The system according to an embodiment of the present invention captures images from a plurality of different directions and angles in multiple residences and and collects and analyzes images of protected persons from IP-CAMs with different specifications and smart terminals added by the protected person or guardian so that differences may occur in the scale and resolution of the collected images, which may reduce accuracy when analyzing images for the same residence.

In order to address these issues and increase the accuracy of the analysis results, the image analysis unit (140) according to an embodiment of the present invention may extract meta information corresponding to the attributes included in the first to nth (n is a natural number) images of different formats collected from one residence.

The image process unit 143 may convert, interpolate, and match the formats of the first to nth images from which attributes are extracted according to a standard to process them into images having a single consistent format.

In detail, the image process unit 143 is a component for implementing the above-described functions and may comprises a conversion unit (1431) converting the scale and resolution of each image to correspond to the attributes of the reference image, an interpolation unit (1433) generating and adding interpolation frames to images that are smaller than or equal to a reference frame among a plurality of images, and a matching unit (1435) defining an area captured by each image according to the captured direction and angle and matching the areas of the corresponding images when the protected person appears in two or more images at the same time.

The conversion unit (1431) may determine the image scale, resolution, etc. of each image with respect to the first to nth images by referring to the meta information and convert the remaining images (e.g., second to nth images) according to one image (e.g., the first image) or a separate fixed standard (e.g., image scale=2.5 arcsecs/pixel, resolution=FHD (1920×1080), etc.).

The interpolation unit (1433) may add an interpolation frame to the image so that the frames of each first to nth image match. As an example, when the frames of the first and third images are 60 fps and the second image is 30 fps, the interpolator (1433) generates and inserts an additional frame with an inter-frame median value between each frame of the second image to process the image to approximate 60 fps.

The matching unit (1435) may identify objects that commonly appear in the first to nth images and process them to share their positions and motions. As the first to nth images are images taken by IP-CAMs and smart terminals installed in different directions and positions, a protected person, an object, may appear in some or all of them, and in order to accurately determine whether the object appearing in each image refers to the same protected person or another object (e.g., outsider, furniture, etc.), in case that the coordinates where the object appears in the image are different, but they are the same object, they point to substantially the same area so that if the object that appears in two or more images is a protected person, this refers to the same area of the same object, so the areas of the two images are matched to track the location of the protected person when the protected person appears.

The motion determination unit (145) may use a prepared learning model for an image for which the conversion, interpolation, and matching process has been completed to determine whether there is abnormal motion of the protected person appearing in the image and output the result.

According to the above-described structure, the image-based remote home care system according to an embodiment of the present invention has high accuracy through image processing such as conversion, interpolation, and matching for the collected images of the protected person, and may determine abnormal motion of the protected person.

Hereinafter, a home care method for a protected person using an image-based remote home care system according to an embodiment of the present invention is described in detail with reference to the drawings.

Figure 4:
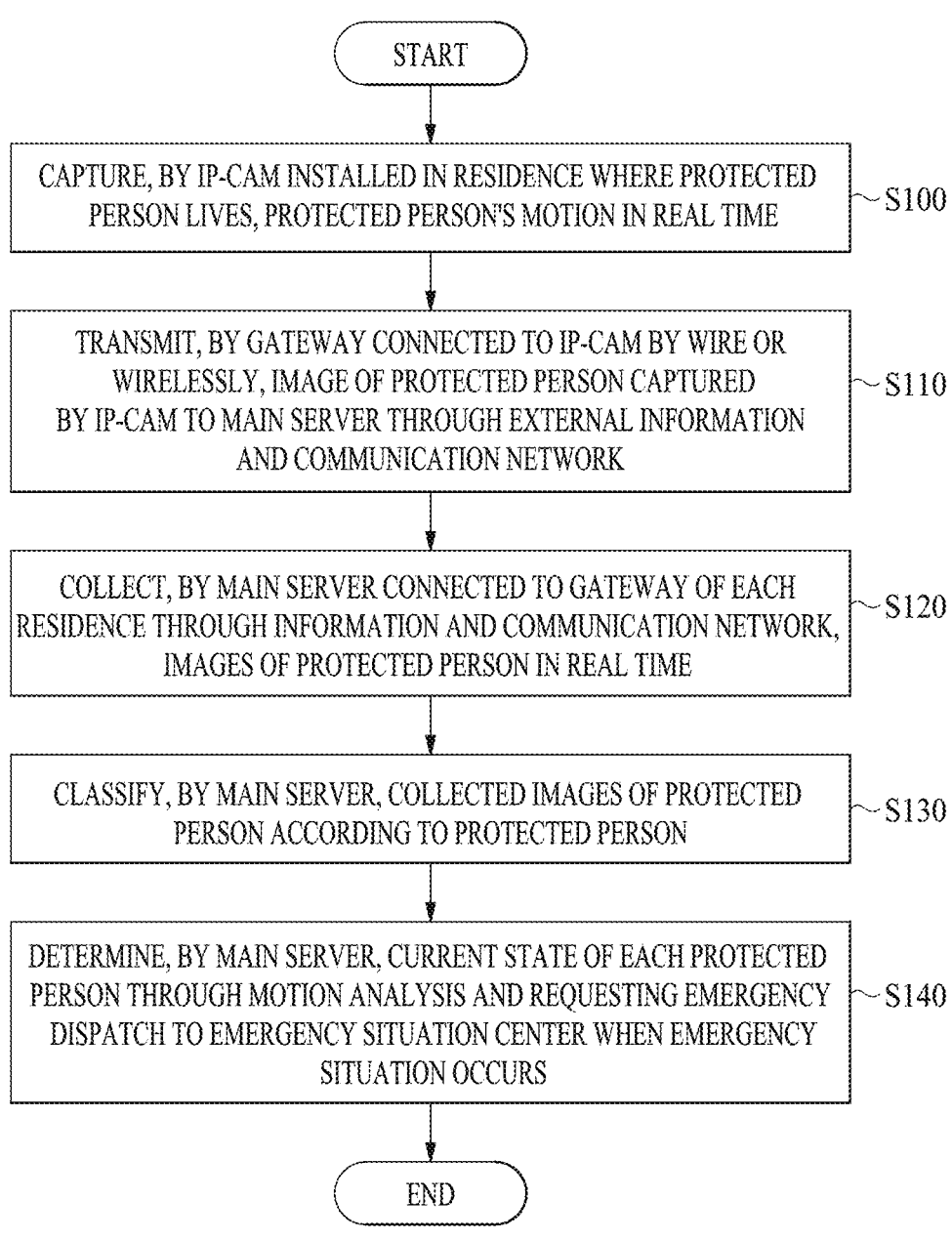
FIG. 4 is a view showing a home care method for a protected person in an image-based remote home care system according to an embodiment of the present invention.

FIG. 4 is a view showing a home care method for a protected person in an image-based remote home care system according to an embodiment of the present invention. In the following description, the executor of each step is the main server and each component that constitutes the image-based remote home care system of the present invention, even if not separately described.

Referring to FIG. 4, a protected person monitoring method of Image-based remote home care system according to an embodiment of the present invention includes capturing, by an IP-CAM installed in the residence where the protected person lives, the protected person's motion in real time (S100), transmitting, by the gateway connected to the IP-CAM by wire or wirelessly, the image of the protected person captured by the IP-CAM to the main server through an external information and communication network (S110), collecting, by the main server connected to the gateway of each residence through an information and communication network, images of the protected person in real time (S120), classifying, by the main server, the collected images of the protected person according to the protected person (S130), and determining, by the main server, the current state of each protected person through motion analysis and requesting emergency dispatch to the emergency situation center when an emergency situation occurs (S140).

First, in S100 where the IP-CAM installed in the residence where the protected person lives records the motion of the protected person in real time, guardians and protected persons who wish to use the home care service of the present invention complete the membership registration process through the main server, and then one or more IP-CAMs and gateways are installed at the protected person's residence, so that the IP-CAM records the protected person's motion in real time.

Next, in S110 where the gateway connected to the IP-CAM by wire or wirelessly transmits the image of the protected person captured by the IP-CAM to the main server through an external information and communication network, the IP-CAM captures the interior of the residence in real time, so that the gateway connected to it transmits the captured images of the protected person to the main server through the information and communication network. Here, the IP-CAM may be connected to the gateway through wired LAN, Bluetooth, or Wi-Fi protocols, and may perform data communication with the main server through TCP/IP protocols. These gateways may be implemented through routers, etc. installed in residences.

Next, in S120 where the main server connected to the gateway of each residence through the information and communication network collects images of the protected person in real time, the main server receives and collects images of the protected person in real time from a gateway installed in the residence of one or more protected persons registered with the service according to S110.

Next, in S130 where the main server classifies the collected images of the protected person by the protected person, images of various protected persons are transmitted in real time from multiple gateways, and the main server classifies the collected images of protected persons by the protected person and stores them in the database.

Further, in S140 where the main server determines the current state of each protected person through motion analysis and requests emergency dispatch to the emergency situation center in the event of an emergency, the main server extracts the protected person from the image through a machine learning model mounted on the main server and determines whether the current motion is an abnormal motion, and if abnormal motion is determined, it is considered that an emergency situation has occurred, and a warning notification may be provided to the guardian terminal. Additionally, the main server may request emergency first aid for the protected person from the emergency situation center.

Here, one or more deep learning techniques may be applied to the machine learning model, and the machine learning model may be used in the analysis process after going through a learning process of at least six months through multiple learning images.

Hereinafter, the technical idea of the present invention is described in detail through an example of a screen provided by an application of an image-based remote home care system according to an embodiment of the present invention.

Figure 5:
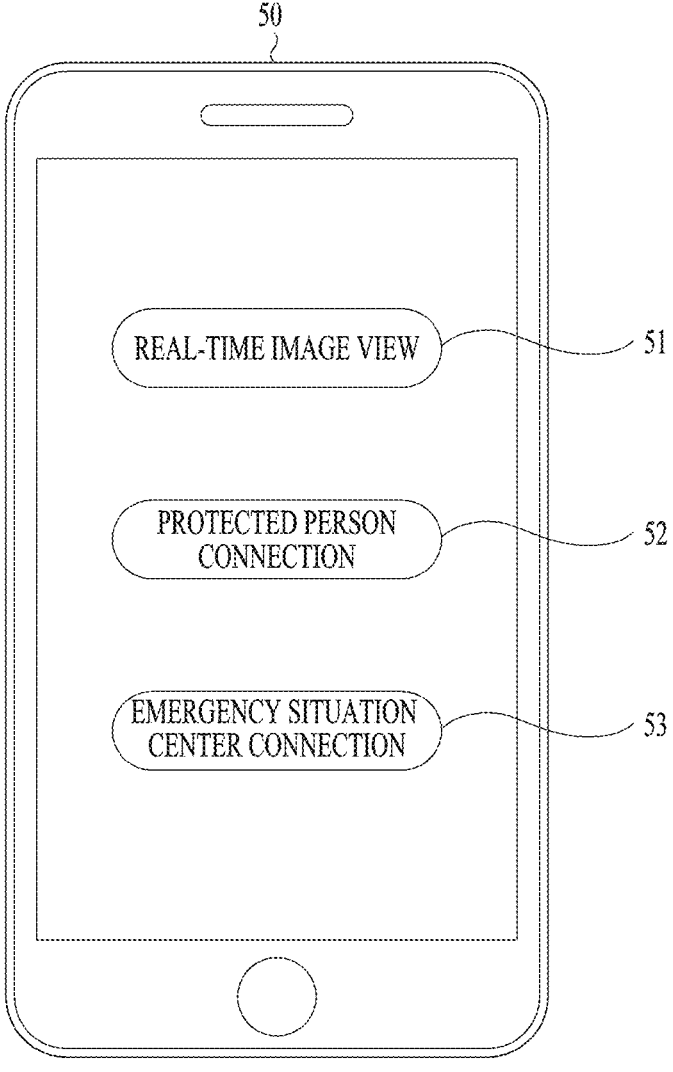
FIGS. 5 and 6 are views illustrating screens provided by an application linked to an image-based remote home care system according to an embodiment of the present invention.
Figure 6:
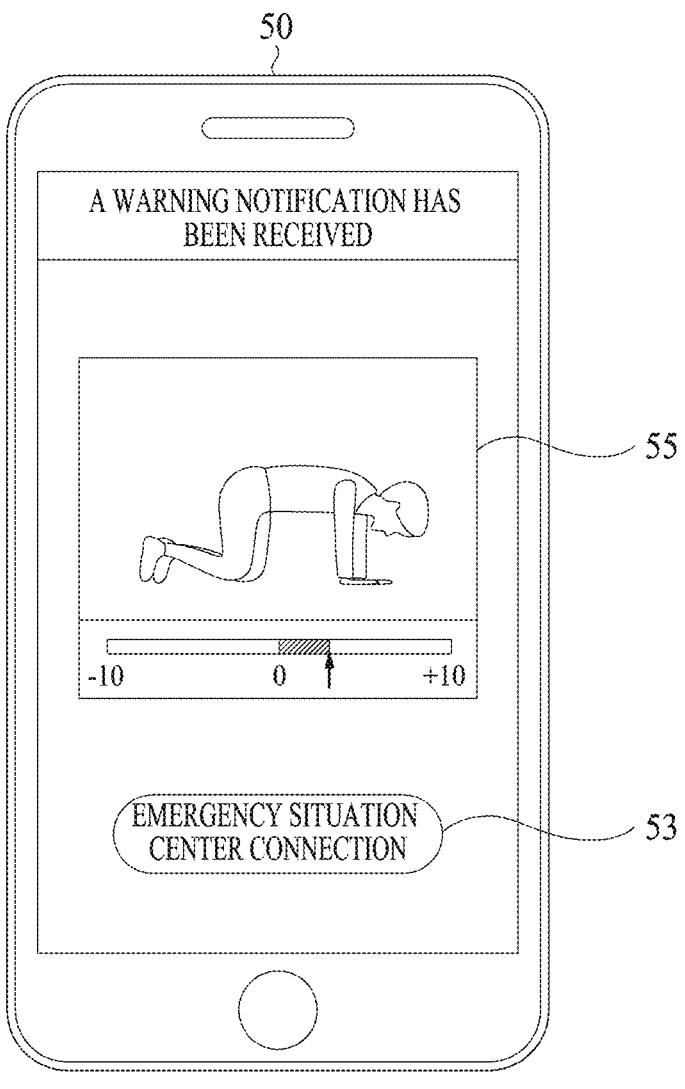

FIGS. 5 and 6 are views illustrating screens provided by an application linked to an image-based remote home care system according to an embodiment of the present invention.

Referring to FIG. 5, the application of the image-based remote home care system according to an embodiment of the present invention may be installed and executed on the guardian terminal 50, such as the guardian's smartphone related to the protected person and may provide functions related to monitoring of the guardian or receive a warning notification message when an emergency situation occurs.

In detail, when running the application, the guardian terminal (50) connects to the main server through the information and communication network and may provide monitoring-related functions such as viewing real-time image (51), connecting to the protected person (52), and connecting to the emergency situation center (53). These applications are usually run in the background of the guardian terminal 50 and may receive warning notification messages in the form of push messages from the main server.

First, the real-time image viewing (51) function is a function that receives and displays the image of the protected person so that the guardian may check the current state of the protected person, and if the guardian selects this function, the application requests the current image of the protected person from the main server, so that the main server identifies the party by checking the identification means of the guardian terminal (50), for example, MAC, phone number, etc., confirms the protected person linked to the identified guardian and transmits the currently receiving image of the protected person to the guardian terminal (50), and thus the image of the protected person may be viewed in real time on the screen of the guardian terminal (50).

The protected person connection (52) function activates the regular phone call or video call function, and when this function is selected, the application attempts to connect by phone to the smart terminal owned by the protected person through the registered phone number or request a video call with the protected person's smart terminal from the main server to make a voice or video call with the protected person through the smart terminal.

The emergency center connection (53) function is to request connection to an emergency center located in an area adjacent to the protected person, such as a fire department or police station, when the protected person recognizes that an emergency situation has occurred to the guardian by checking the image of the protected person or making a phone call, and if a guardian who confirms an emergency situation for a protected person selects this function, he/she is connected to a terminal operated by the emergency situation center and may request dispatch to the protected person.

Referring to FIG. 6, as an example of the functionality provided, while the image-based remote home care system according to an embodiment of the present invention is monitoring the the protected person, if it is determined that abnormal motion is displayed when analyzing the protected person's image using a machine learning model, the current situation is reported to the guardian terminal (50).

If it is determined that abnormal motion has occurred for the protected person, the main server will send an image of the protected person for a total of 20 seconds, about 10 seconds before and after the time at which abnormal motion was determined, along with a warning notification, to the guardian's terminal (50), and the application may display the above-described amount of images (55) of the protected person in which abnormal motion has been determined along with a warning notification message on the guardian terminal (50).

Accordingly, the guardian may directly check the current state of the protected person and whether an emergency situation has occurred, and if it is determined that it is an emergency situation, the emergency center connection (53) function may be selected to attempt to connect to the emergency center to request the dispatch for the protected person.

Although many details are described in detail in the above description, this should be interpreted as an example of a preferred embodiment rather than limiting the scope of the invention. Therefore, the invention should not be determined by the described embodiments, but by the scope of the patent claims and their equivalents.

DESCRIPTION OF REFERENCE NUMBERS

1: Residence,
3: Central management center
5: Guardian,
7: Emergency situation center
10: IP-CAM,
20: Smart terminal
30: Gateway,
50: Guardian terminal
100: Main server,
110: Image collection unit
120: Member management unit,
125: Member database
130: Image classification unit,
135: Image storage
140: Image analysis unit,
141: Attribute extraction unit
143: Image process unit,
1431: Conversion unit
1433: Interpolation unit,
1435: Matching unit
145: Motion determination unit,
150: Learning unit
155: Learning database,
160: Notification generation unit

The invention claimed is:

1. An image-based remote home care system comprising:
   one or more IP-CAMs installed in the residence where a protected person lives and recording the protected person's motion in real time;
   a gateway connected to the IP-CAM by wire or wirelessly and transmitting images of the protected person captured by the IP-CAM to an external information and communication network; and
   a main server connected to the gateway of each residence through the information and communication network to collect images of the protected person in real time, determining the current state of the protected person through motion analysis for each protected person, and requesting emergency dispatch to an emergency situation center in the event of an emergency,
   wherein the main server analyzes the collected images of the protected person using a learning model that has been machine-learned over several months from a number of learning images captured in various environments, wherein the gateway is located in the residence and is further connected to one or more smart terminals installed with an application that operates in conjunction with the main server, and wherein the application captures the protected person in real time at different positions and angles from the IP-CAM through a camera mounted on the smart terminal and transmits the image of the protected person to the main server through the gateway.

2. The image-based remote home care system of claim 1, wherein the main server comprises:

an image collection unit receiving one or more images of the protected person in real time from the gateway of each residence;

a member management unit providing a membership registration procedure for the protected person and a guardian, storing the information of registered protected person and guardian in the member database, and identifying the protected person who is the party to the collected image;

an image classification unit classifying the corresponding images of the protected person for each identified protected person and storing images in an image storage;

an image analysis unit extracting the protected person appearing in the classified images of the protected person and analyzing the motion of the extracted protected person to determine whether an emergency situation has occurred; and a learning unit performing machine learning using a number of learning images stored in the learning database and providing a learning model learned when analyzing the motion of the protected person in the image analysis unit.

3. The image-based remote home care system of claim 2, wherein the main server comprises a notification generation unit, when the image analysis unit determines that an emergency situation has occurred for the protected person, referring to the guardian and protected person's information to identify the protected person's guardian and providing a warning notification about the emergency situation to the guardian's terminal.

4. The image-based remote home care system of claim 2, wherein the protected person's image is divided into a plurality of images with different characteristics taken at the same time by a plurality of IP-CAMs or smart terminals, and wherein the image analysis unit comprises:

an attribute extraction unit referring to meta information included in the plurality of images to extract attributes including scale, resolution, and frame of each image;

an image process unit converting the plurality of images into image data in a consistent format according to the extracted attributes and tracking the protected person appearing in the images; and a motion determination unit recognizing the motion of the protected person in the images using the learning model and determining whether the motion corresponds to an emergency situation.

5. The image-based remote home care system of claim 4, wherein the image process unit comprises:

a conversion unit converting the scale and resolution of each image to correspond to the attributes of the reference image;

an interpolation unit generating and adding interpolation frames to images that are smaller than or equal to a reference frame among a plurality of images; and a matching unit defining an area captured by each image according to the captured direction and angle and matching the areas of the corresponding images when the protected person appears in two or more images at the same time.

6. The image-based remote home care system of claim 1, wherein the main server is further connected to one or more guardian terminals owned by the guardian or social worker of the protected person through the information and communication network, and wherein the guardian terminal receives a warning notification from the main server when an emergency situation occurs in the related protected person and requesting emergency dispatch to the emergency situation center according to the guardian's operation.

* * * * *